United States Patent [19]
Sasaki et al.

[11] Patent Number: 5,727,104
[45] Date of Patent: Mar. 10, 1998

[54] OPTICAL TRANSMISSION MODULE AND A METHOD OF PRODUCING THE SAME

[75] Inventors: Seimi Sasaki; Kazuhiro Tanaka, both of Kawasaki, Japan

[73] Assignee: Fujitsu Limited, Kanagawa, Japan

[21] Appl. No.: 723,022

[22] Filed: Sep. 30, 1996

[30] Foreign Application Priority Data

May 24, 1996 [JP] Japan .................................. 8-129974

[51] Int. Cl.⁶ .................................................. G02B 6/42
[52] U.S. Cl. ................................................ 385/92; 385/94
[58] Field of Search ........................... 385/88–94, 134, 385/139, 147

[56] References Cited

U.S. PATENT DOCUMENTS

| | | | |
|---|---|---|---|
| 5,291,572 | 3/1994 | Blonder et al. | 385/94 |
| 5,313,546 | 5/1994 | Toffetti | 385/94 X |
| 5,535,296 | 7/1996 | Uchida | 385/89 |

FOREIGN PATENT DOCUMENTS

| | | |
|---|---|---|
| 6003566 | 1/1994 | Japan . |
| 6324276 | 11/1994 | Japan . |
| 7169832 | 7/1995 | Japan . |

*Primary Examiner*—John D. Lee
*Attorney, Agent, or Firm*—Helfgott & Karas, P.C.

[57] ABSTRACT

An optical transmission module which can provide hermetic sealing with reliability, is low in cost and excellent in mass productivity and a method of producing such an optical transmission module is provided. A sealing material is affixed to a cover section in advance. The sealing material is in the form of a film formed by screen printing along the joining portion between a body section and the cover section and having a thickness matching the amount of gap between the body section and the cover section at the joining portion. A conversion device is received in a recess of the body section, and an optical fiber is inserted into the body section from outside along a stepped portion and connected to the conversion device. With the cover section placed on the body section, the two are heated. As the sealing material, soldering paste is used, for example.

11 Claims, 8 Drawing Sheets

PRIOR ART

FIG. 8

OPTICAL TRANSMISSION MODULE AND A METHOD OF PRODUCING THE SAME

BACKGROUND OF THE INVENTION

(1) Field of the Invention

The present invention relates to an optical transmission module for performing light-to-current or current-to-light conversion and a method of producing the same, and more particularly, to an optical transmission module of which the interior needs to be kept airtight and a method of producing such an optical transmission module.

(2) Description of the Related Art

In recent years, high-speed mass data transmission is demanded in the field of information communications, and optical transmission systems are indispensable for meeting the demand. Currently, therefore, necessary facilities etc. are being constructed with a view to expanding and spreading optical communication networks.

In such optical transmission systems, devices called optical transmission modules which include optical and electric circuits for carrying out light-to-current or current-to-light conversion are used in large quantities at various locations. A current manufacturing capacity per optical transmission module maker is approximately 100,000 modules/year, and with the spread of optical communication networks, a demand of more than 1,000,000 modules/year is expected in the future. Since an increasing demand for optical transmission modules is expected in the future, the prime objective is to improve the mass productivity and to reduce the costs.

Moreover, an optical transmission module is required to have a structure such that a light-to-current conversion device therein is hermetically sealed, in order to ensure high reliability and long service life. Hermetic or airtight sealing of the optical transmission module is necessary for preventing the light-to-current conversion device from being corroded by moisture, oxygen or the like. The present invention relates to a hermetic or airtight sealing structure for an optical transmission module.

The technique mentioned below, for example, is conventionally employed for the hermetic sealing structure of an optical transmission module.

Figure 7A:
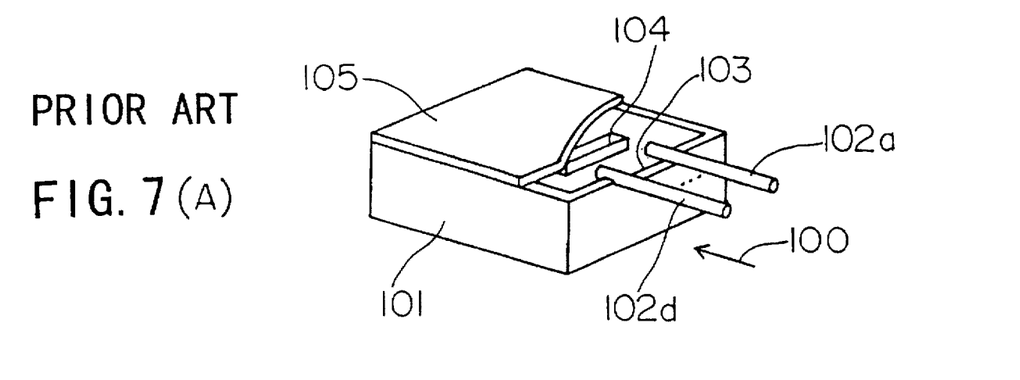
FIG. 7(A) is a perspective view of a first conventional optical transmission module.
Figure 7B:
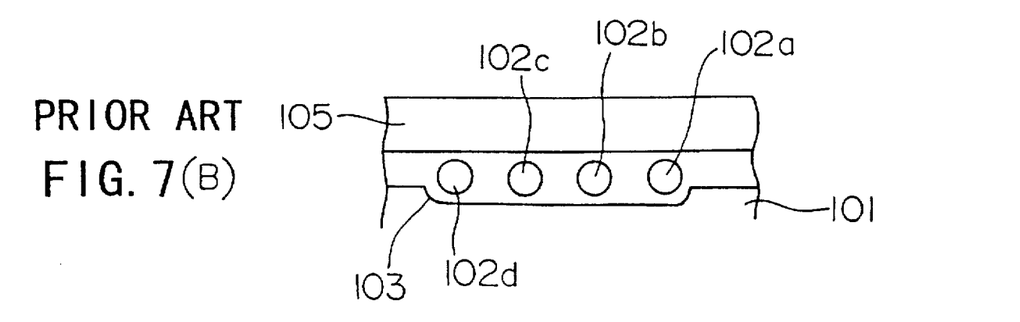
FIG. 7(B) is a side elevation of the module as viewed in the direction of arrow 100 in FIG. 7(A)

FIGS. 7(A) and 7(B) illustrate the hermetic sealing structure for an optical transmission module disclosed in Japanese patent application laid-open publication No. 6-3566, wherein FIG. 7(A) is a perspective view of the optical transmission module and FIG. 7(B) is a side elevation of the module as viewed in the direction of arrow 100 in FIG. 7(A). Specifically, a U-shaped groove 103 having a depth smaller than the diameter of optical fibers 102a to 102d is cut in an end wall of a package body 101, and the optical fibers 102a to 102d are inserted into the package body 101 through the U-shaped groove 103 and coupled to a light-to-current conversion device 104. A cover 105 [partially cut away in FIG. 7(A)] is placed on the package body 101. Solder is applied in advance to the joint between the package body 101 and the cover 105 as well as to the U-shaped groove 103, and the package body 101 and the cover 105 are heated so that they may be joined together. In this case, molten solder fills in the U-shaped groove 103, whereby the internal space defined by the package body 101 and the cover 105 is closed in an airtight fashion.

Figure 8:
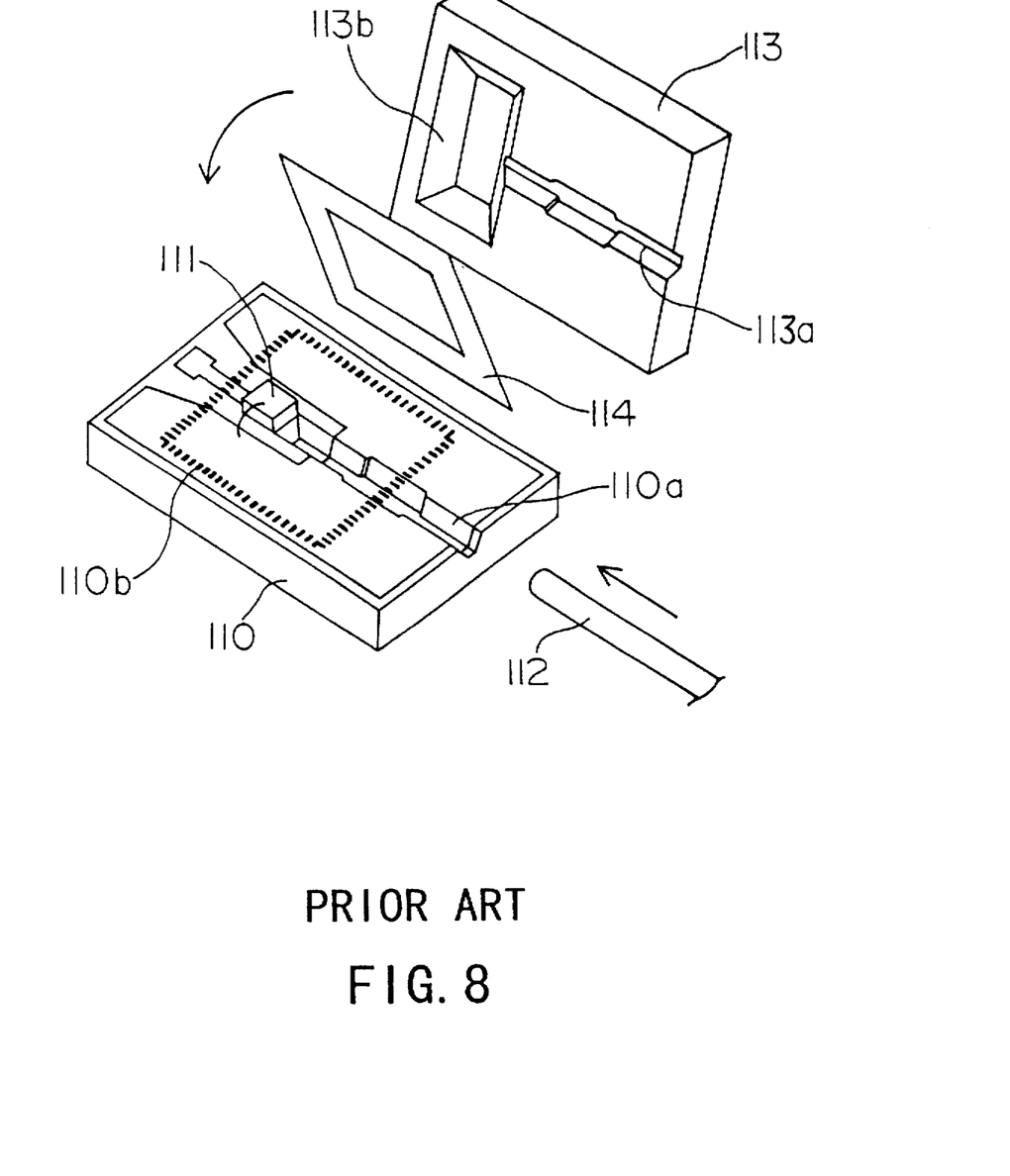
FIG. 8 is a perspective view of a second conventional optical transmission module.

FIG. 8 shows the hermetic sealing structure for an optical transmission module disclosed in Section 6.2 of the papers for the international convention "VII International Workshop on Optical Access Networks" held in 1995. As shown in FIG. 8, a light-to-current conversion device 111 is mounted on a silicon substrate 110 having a groove 110a cut therein, and an optical fiber 112 is fitted in the groove 110a and coupled to the light-to-current conversion device 111. In another silicon substrate 113 are formed a groove 113a for receiving the optical fiber 112 and a recess 113b for receiving the light-to-current conversion device 111. The silicon substrate 113, which serves as a cover, is placed on the silicon substrate 110. In this case, an adhesive sheet 114 having a shape corresponding to a sealing region 110b which surrounds the light-to-current conversion device 111 is interposed between the silicon substrates 113 and 110, and the substrates 113 and 110 are pressed against each other with a predetermined load applied thereto, thus joining the substrates together. Consequently, the space inside the sealing region 110b is hermetically closed and the optical fiber 112 is securely fixed.

In the hermetic sealing structure for an optical transmission module shown in FIGS. 7(A) and 7(B), however, solder must be applied in advance to the joint between the package body 101 and the cover 105 as well as to the U-shaped groove 103, thus requiring an extra step of solder application during the course of the production process. Also, the solder applied is almost uniform in thickness, and therefore, the U-shaped groove 103 and its peripheral portion may be applied with an insufficient quantity of solder so that the gap is not completely filled with solder, making it difficult to achieve perfectly hermetic sealing.

The optical transmission module shown in FIG. 8 was developed recently with a view to improving the mass productivity. In this module, a conversion device, an optical fiber, etc. are contained in a package made up of silicon substrates which have been subjected to anisotropic etching, and the interior of the package is closed hermetically. More specifically, the hermetic joining is achieved using the adhesive sheet 114 having a uniform thickness of about 75 μm, whereas the gap between the joined silicon substrates 113 and 110 is approximately 10 μm. The thickness of the adhesive sheet 114 is set to a value such that hermetic sealing is reliably achieved with the adhesive of the sheet 114 adhering to the periphery of the optical fiber 112 received in the grooves 110a and 113a. In the other region of the adhesive sheet 114 than that corresponding to the grooves 110a and 113a, however, surplus part of the adhesive may be forced into the junction between the light-to-current conversion device 111 and the optical fiber 112, possibly adversely affecting the optical coupling characteristics. Further, during the assembly of optical transmission modules, adhesive sheets 114 must be placed one by one accurately on the sealing region 110b of the silicon substrate 110, which lowers the operation efficiency.

SUMMARY OF THE INVENTION

An object of the present invention is to provide an optical transmission module which provides hermetic sealing with reliability and which also can be mass-produced at low cost with high productivity.

To achieve the above object, there is provided a method of producing an optical transmission module which includes a conversion device, an optical fiber optically coupled to the conversion device, a body section, and a cover section, wherein at least one of the body section and the cover section has a recess for receiving the conversion device, at least one of the body section and the cover section has a stepped portion for guiding the optical fiber, and a gap between the body section and the cover section is sealed by a sealing material. The method comprises the step of applying the sealing material to one of the body section and the cover section in such a manner that the sealing material applied to a portion corresponding to the stepped portion matches the shape of the stepped portion.

Also, to achieve the above object, an optical transmission module is provided. The optical transmission module comprises a conversion device, an optical fiber optically coupled to the conversion device, a body section and a cover section, at least one of the body section and the cover section having a recess for receiving the conversion device, at least one of the body section and the cover section having a stepped portion for guiding the optical fiber, and a sealing material applied to one of the body section and the cover section in such a manner that the sealing material applied to a portion corresponding to the stepped portion matches the shape of the stepped portion, to thereby seal a gap between the body section and the cover section.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments according to the present invention will be hereinafter described with reference to the drawings.

Figure 1:
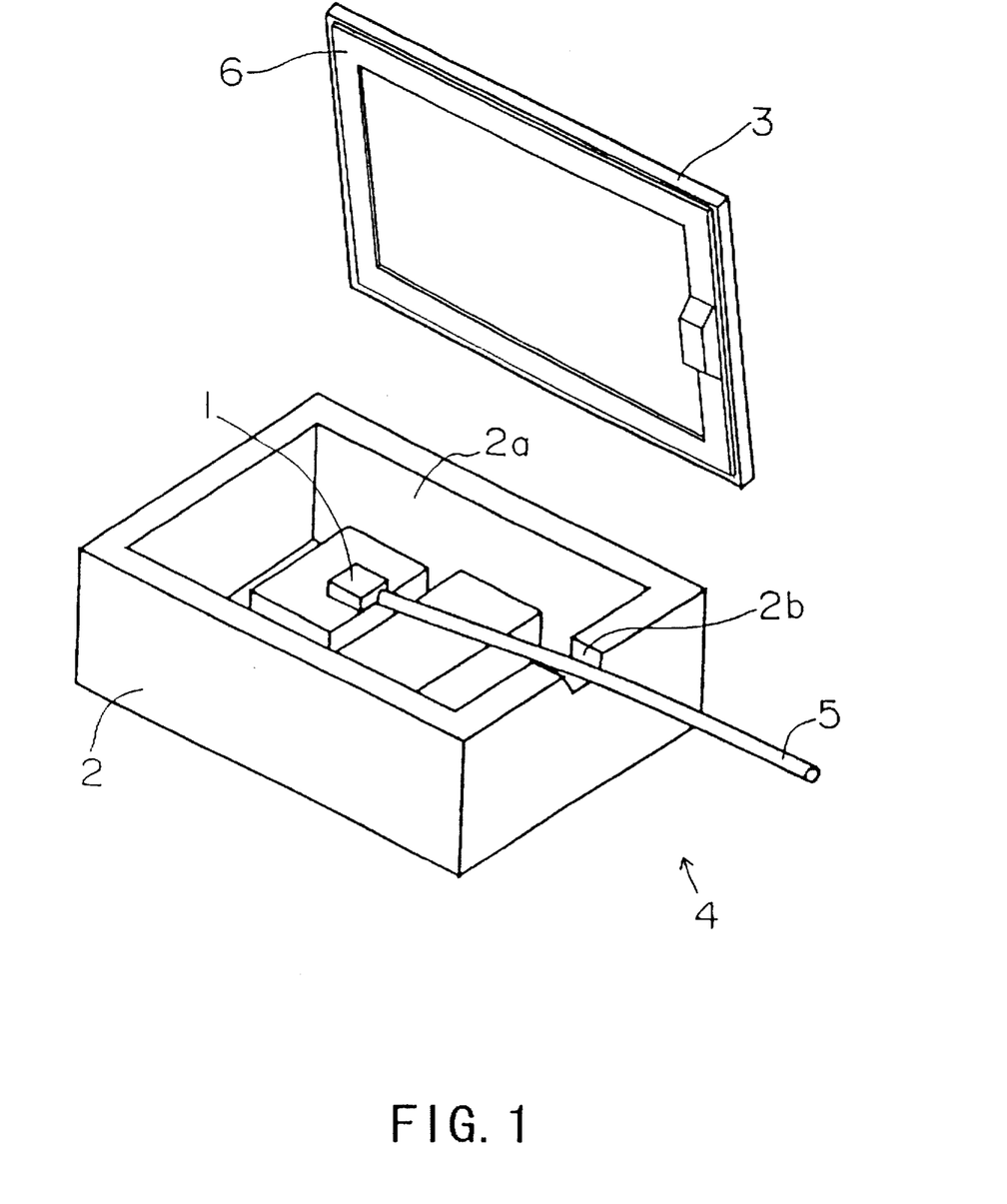
FIG. 1 is a perspective view showing an arrangement according to a first embodiment of the present invention.

Referring first to FIG. 1, the arrangement of an optical transmission module according to a first embodiment of the present invention will be explained.

The first embodiment comprises a light-to-current conversion device 1, a package 4 made up of a body section 2 having a recess 2a and a cover section 3 and receiving the light-to-current conversion device 1 in the recess 2a, an optical fiber 5 inserted into the package 4 from outside through an opening 2b which is defined between the body section 2 and cover section 3 of the package 4 joined to each other and connected to the light-to-current conversion device 1, and a ring-shaped sealing film 6 affixed to the cover section 3 of the package 4 along a joining portion at which the body section 2 and the cover section 3 are joined together and having a thickness set in accordance with the amount of gap between the body section 2 and the cover section 3 at the joining portion.

The body section 2 and cover section 3 of the package 4 are made of one of materials including metals such as Kovar as a typical example, ceramic materials, plastic materials, etc. The opening 2b is formed by cutting an end wall of the body section 2 having the recess 2a. Also, portions of the body section 2, the cover section 3 and the optical fiber 5 to which the sealing film 6 is to be affixed later are plated with gold by metallizing. The sealing film 6, which is made of soldering paste, is affixed to the cover section 3 of the package 4 by screen printing. By previously roughening the surface of the portion of the cover section 3 where the sealing film 6 is to be affixed, the sealing film 6 can be easily affixed to the roughened surface of the cover section 3. Most part of the sealing film 6 has a thickness of 50 μm, for example, and only a part of the film 6 corresponding in position to the opening 2b has a thickness of 150 μm in the case where the depth of the opening 2b is 150 μm. A method of affixing the sealing film 6 with different thicknesses to the cover section 3 will be described later with reference to FIGS. 3 to 5.

Figure 2:
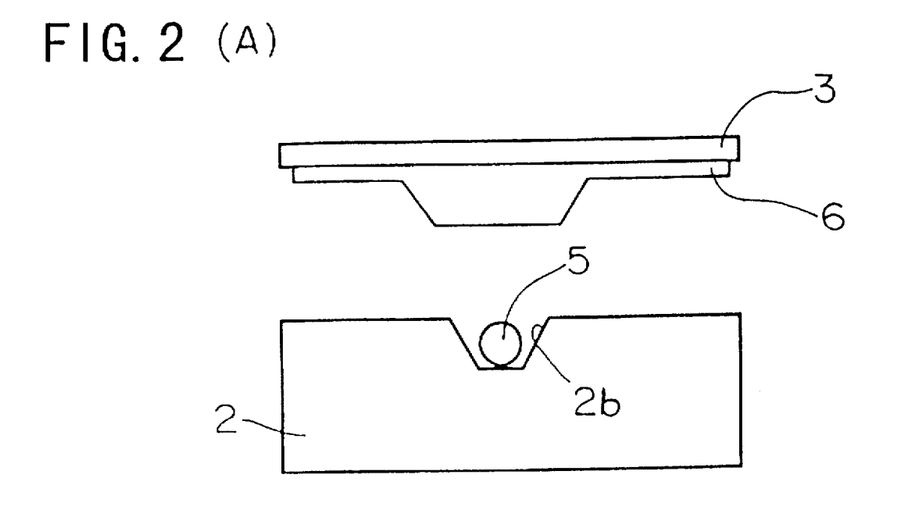
FIG. 2(A) is a side view showing a state before a cover section is placed on a package body section.
FIG. 2(B) is a side view showing a state after the package body section and the cover section placed thereon are heated.

In an assembling step, the light-to-current conversion device 1 is received in the recess 2a of the body section 2, and the optical fiber 5 is inserted into the package 4 from outside through the opening 2b and coupled to the light-to-current conversion device 1. Then, the cover section 3 is placed on the body section 2, as shown in FIG. 2(A), and the two are heated. In this case, the cover section 3 is pressed against the body section 2 with a suitable load applied thereto. As a result, the sealing film 6 made of soldering paste melts, so that the gap between the body section 2 and the cover section 3 is sealed and at the same time the opening 2b is sealed as the solder fills in the gap around the optical fiber 5, as shown in FIG. 2(B). In the subsequent cooling step, the body section 2 and the cover section 3 are firmly joined together and the optical fiber 5 is securely fixed to the package 4.

By suitably setting the thicknesses of the sealing film 6 in accordance with the amount of gap, deficiency of solder at the opening 2b can be prevented, thus achieving perfect airtight sealing, and also surplus part of the sealing material is prevented from flowing from the region other than the opening 2b to the optical coupling section. Further, it is not necessary to apply solder beforehand, and accordingly, the solder application step can be omitted, enhancing the operation efficiency.

The method of affixing the sealing film 6 with different thicknesses to the cover section 3 will be now explained.

Figure 3:
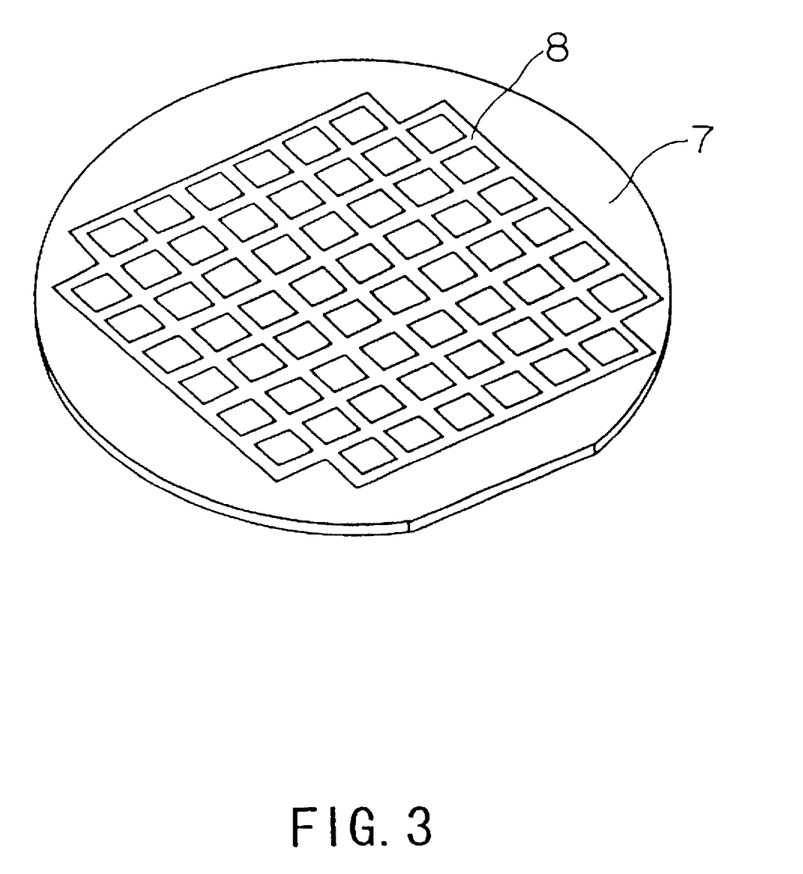
FIG. 3 is a perspective view showing a state in which a film of sealing material with a first thickness is formed on a silicon wafer.
Figure 4:
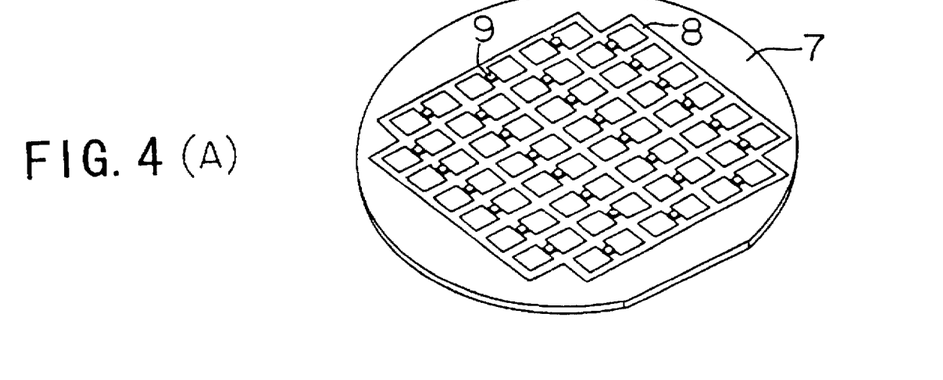
FIG. 4(A) is a perspective view showing a state in which a film of sealing material with a second thickness is formed on the silicon wafer.
FIG. 4(B) is an enlarged view of a part shown in FIG. 4(A)
FIG. 4(C) is a perspective view of a cover section with a sealing film adhering thereto.

FIG. 3 is a view showing a state in which a film of the sealing material 6 with a first thickness is formed, and FIGS. 4(A) to 4(C) illustrate a state in which a film of the sealing material 6 with a second thickness is formed. An example of fabricating the cover section 3 by using a silicon wafer 7, which is generally used in semiconductor production process, will be explained. First, a pattern of soldering paste 8 with a thickness of 50 µm is transferred to the silicon wafer 7 by screen printing using a mesh mask (FIG. 3). The thickness of the soldering paste pattern is determined by the thickness of an emulsion forming the mesh mask.

Subsequently, using another mesh mask, a pattern of soldering paste 9 with a thickness of 100 µm is transferred onto the 50 µm-thick soldering paste 8 on the silicon wafer 7 [FIG. 4(A)]. Thus, the soldering paste film 8, 9 having desired thicknesses of 50 µm and 150 µm and having a desired shape is formed on the silicon wafer 7. FIG. 4(B) is an enlarged view of a part shown in FIG. 4(A).

Finally, the silicon wafer 7 is cut with a dicing saw along the dashed lines shown in FIG. 4(B), to obtain cover sections 3 as shown in FIG. 4(C).

In this manner, cover sections 3 each affixed with a sealing film 6 having different thicknesses are fabricated with improved mass productivity. The material of the cover section 3 obtained by the aforementioned fabrication method is not limited to silicon, but may be of any other semiconductor wafers generally used. Also, the material of the sealing film 6 that can be used for screen printing is not limited to soldering paste alone, and a thermosetting resin, thermoplastic resin or the like may be used instead. Further, the cover section 3 may be made of glass, and in this case, photo-setting resin can be used as the sealing material 6.

Figure 5:
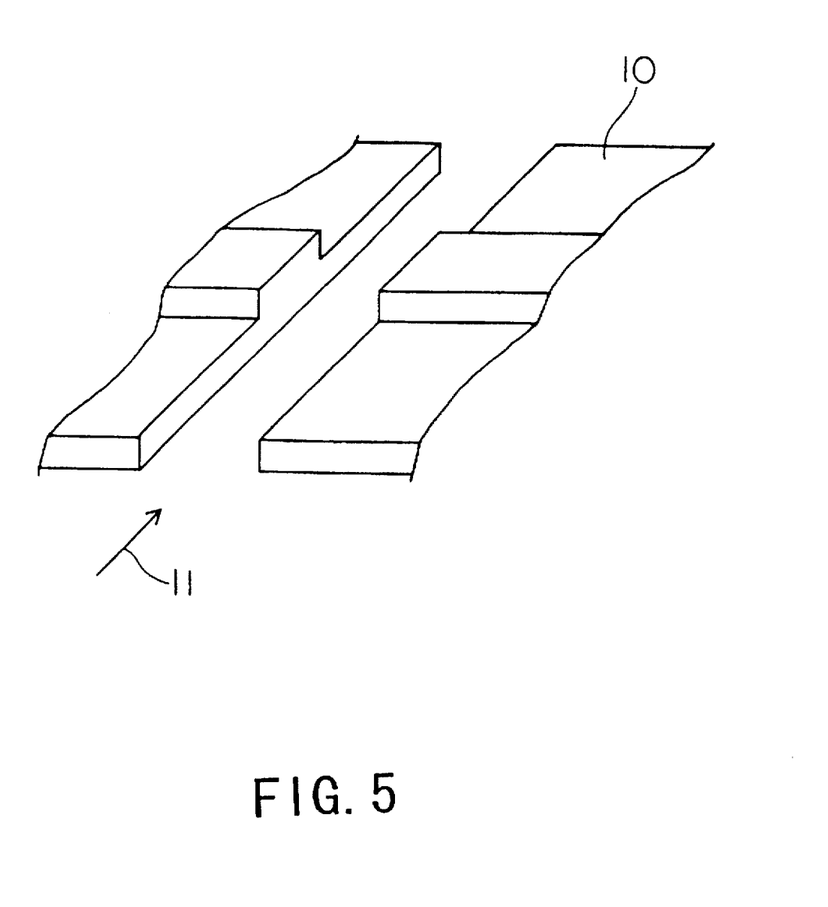
FIG. 5 is a view illustrating another method of forming a film of sealing material with desired thicknesses by screen printing.

To form a sealing film 6 with desired thicknesses by screen printing, a method shown in FIG. 5 may be used instead of the method shown in FIGS. 3 and 4(A) to 4(C). Specifically, a mesh mask of emulsion 10 has a stepped portion with a different thickness formed thereon, and a squeegee is moved in the direction of arrow 11 so that the sealing film 6 may have different thicknesses. With this method, a sealing film with different thicknesses can be formed by a single transfer operation.

In the first embodiment described above, the sealing film 6 is affixed to the cover section 3, but it may be affixed to the body section 2 instead.

An optical transmission module according to a second embodiment will be now described.

Figure 6:
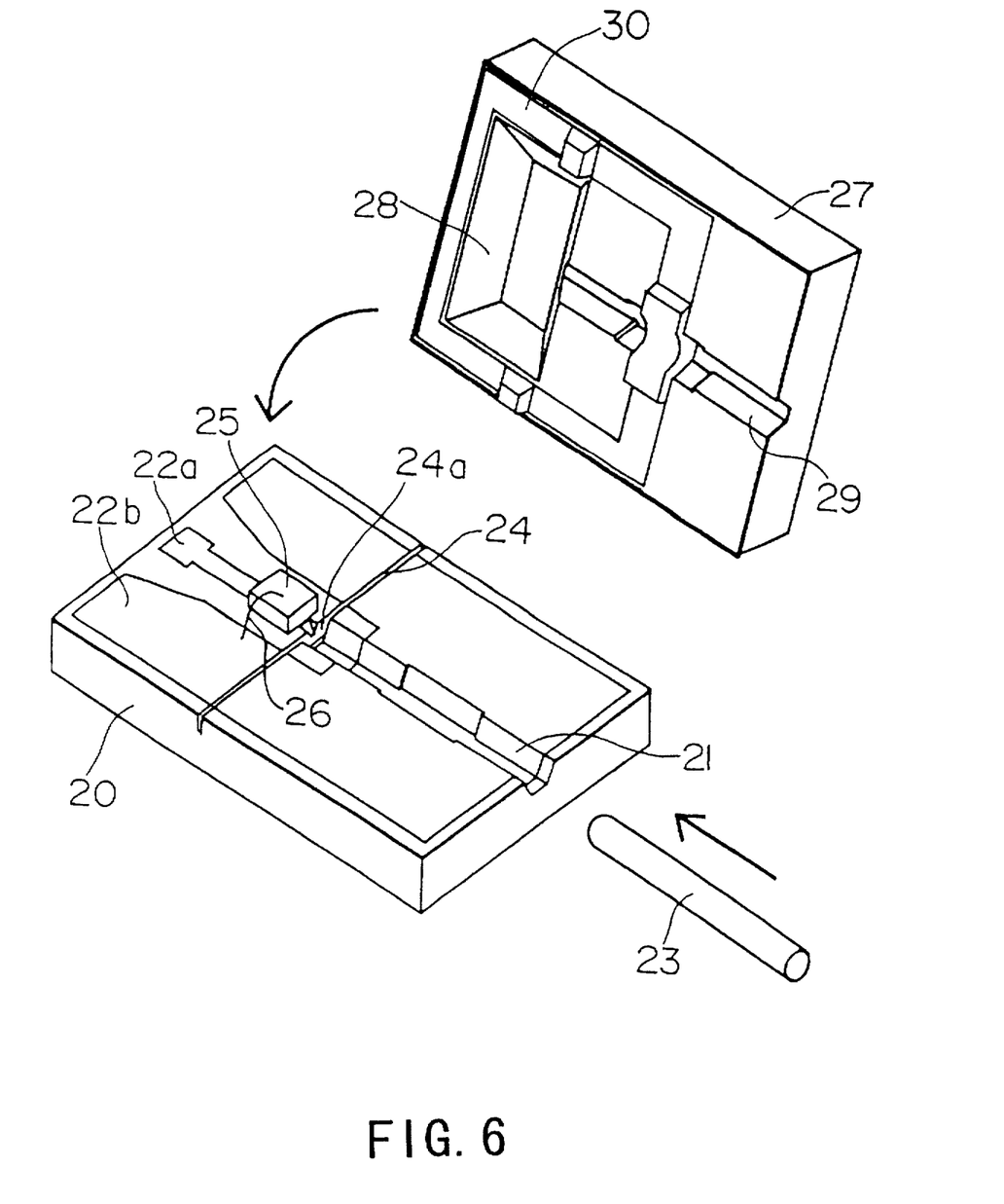
FIG. 6 is a perspective view showing an arrangement according to a second embodiment.

FIG. 6 is an exploded perspective view showing the arrangement of the second embodiment. Specifically, a package substrate 20 comprises a silicon substrate having a thickness of, for example, 1 mm. The silicon substrate is subjected to thermal oxidation to form a silicon oxide film on its surface. Then, using a photoresist mask, a predetermined portion of the silicon oxide film is removed, and a V-groove 21 etc. are formed on the predetermined portion by wet etching or the like. Also, metallic layers 22a and 22b which later serve as electrode patterns are formed on the surface of the substrate. A solder layer is formed on the metallic layer 22a at a location where a light-to-current conversion device 25 is to be arranged. Further, a rectangular groove 24 is cut with a dicing saw, the groove 24 having a vertical wall 24a which later serves as a stopper against which an end of an optical fiber 23 is abutted. In this manner, the package substrate 20 is fabricated.

The light-to-current conversion device 25 is arranged at a predetermined position on the package substrate 20, and the package substrate 20 with the device 25 thereon are heated at about 310° C., whereby signal lines on the bottom surface of the light-to-current conversion device 25 are soldered to the metallic layer 22a. Subsequently, a grounding line on the top face of the light-to-current conversion device 25 is connected to the metallic layer 22b by a bonding wire 26. The optical fiber 23 is then fitted in the V-groove 21, and with the fiber end abutted against the vertical wall 24a of the rectangular groove 24 (with the optical axis of the optical fiber 23 aligned with Bat of the light-to-current conversion device 25), the optical fiber 23 is temporarily fixed.

A cover 27 also comprises a silicon substrate, and following a process similar to that of fabricating the package substrate 20, a recess 28 of 500 µm deep for receiving the light-to-current conversion device 25 and a V-groove 29 of 70 µm deep for receiving the optical fiber 23 are formed. A large number of small grooves are also formed by wet etching on a portion of the cover 27 where a film of sealing material 30 is to be affixed later, thereby obtaining a roughened surface.

Subsequently, like the first embodiment, the sealing film 30 is affixed to the cover 27 by screen printing. In the second embodiment, a thermoplastic adhesive is used as the material of the sealing film 30. The sealing film 30 has a thickness of, for example, 70 µm, at portions corresponding to the V-groove 21 and rectangular groove 24 of the package substrate 20, and a thickness of 15 µm for the remaining portion.

The cover 27 thus affixed with the sealing film 30 is placed on the package substrate 20 in which the optical fiber 23 is temporarily fixed. The cover and the substrate are then heated at about 200° C. with a load applied thereto. Consequently, the cover 27 and the package substrate 20 are firmly joined together and the space in which the light-to-current conversion device 25 is arranged is closed in an airtight fashion. Simultaneously, the optical fiber 23 is securely fixed to the package substrate 20. Since the reaction temperature of the thermoplastic adhesive used as the sealing material 30 is lower than the melting point of solder used for fixing the light-to-current conversion device 25 in position, the device 25 is in no way adversely affected by the heating at about 200° C.

Although in the second embodiment thermoplastic adhesive is used as the sealing material 30, soldering paste, thermosetting adhesive, photo-setting adhesive or the like may be used instead.

As described above, according to the present invention, a sealing film having a thickness distribution matching the amount of gap between the body section and cover section of the package is used. Consequently, the interior of the package can be closed in a perfectly airtight fashion, without impairing the optical coupling characteristics.

Also, screen printing is employed as a method of forming a film of sealing material, and a portion of the package on which the sealing film is formed is made of a semiconductor wafer; therefore, unlike in conventional packages, it is unnecessary to accurately position and affix adhesive sheets one by one to individual cover sections. As a result, mass production is facilitated, making it possible to provide low-cost optical transmission modules. Further, restrictions on usable sealing materials for screen printing are relaxed, because solder, thermosetting resins, thermoplastic resins, photo-setting resins, etc. can be used as the sealing material.

Furthermore, since the conventionally required step of applying solder beforehand can be omitted, the production process is simplified and the operation efficiency can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of producing an optical transmission module including a conversion device, an optical fiber optically coupled to the conversion device, a body section, and a cover section, at least one of the body section and the cover section having a recess for receiving the conversion device, at least one of the body section and the cover section having a stepped portion for guiding the optical fiber, a gap between the body section and the cover section being sealed by a sealing material, the method comprising the step of:

applying the sealing material to one of the body section and the cover section in such a manner that the sealing material applied to a portion corresponding to the stepped portion matches a shape of the stepped portion.

2. The method according to claim 1, wherein the sealing material is applied so as to match the shape of the stepped portion by carrying out screen printing a plurality of times.

3. The method according to claim 1, wherein the sealing material is applied so as to match the shape of the stepped portion by carrying out screen printing only once with use of a mesh mask having different thicknesses of emulsion.

4. The method according to claim 1, which further comprises the step of forming the recess and the stepped portion by anisotropic etching.

5. An optical transmission module comprising:

a conversion device;

an optical fiber optically coupled to said conversion device;

a body section and a cover section, at least one of said body section and said cover section having a recess for receiving said conversion device, at least one of said body section and said cover section having a stepped portion for guiding said optical fiber; and a sealing material applied to one of said body section and said cover section in such a manner that the sealing material applied to a portion corresponding to the stepped portion matches a shape of the stepped portion, to thereby seal a gap between said body section and said cover section.

6. The optical transmission module according to claim 5, wherein a portion of said body section or said cover section to which said sealing material is to be affixed has a surface thereof roughened.

7. The optical transmission module according to claim 5, wherein said sealing material is a thermosetting resin.

8. The optical transmission module according to claim 5, wherein said sealing material is a thermoplastic resin.

9. The optical transmission module according to claim 5, wherein a portion of said body section or said cover section to which said sealing material is to be affixed is subjected to metallizing, and said sealing material is soldering paste.

10. The optical transmission module according to claim 5, wherein said body section or said cover section comprises a glass substrate, and said sealing material is a photo-setting resin.

11. The optical transmission module according to claim 5, wherein said sealing material hermetically closes a space defined between said body section and said cover section when said body section and said cover section are joined together, and also securely fixes said optical fiber to said body section and said cover section.

* * * * *